(12) United States Patent
Gawron

(10) Patent No.: US 9,596,828 B2
(45) Date of Patent: Mar. 21, 2017

(54) ANIMAL CAGE LITTER COMPOSITION, ESPECIALLY SUITABLE FOR CATS

(71) Applicant: Tomasz Gawron, Myslowice (PL)

(72) Inventor: Tomasz Gawron, Myslowice (PL)

( * ) Notice: Subject to any disclaimer, the term of this patent is extended or adjusted under 35 U.S.C. 154(b) by 119 days.

(21) Appl. No.: 14/274,562

(22) Filed: May 9, 2014

(65) Prior Publication Data

US 2015/0059654 A1 Mar. 5, 2015

(30) Foreign Application Priority Data

Sep. 5, 2013 (PL) .......................... 405245

(51) Int. Cl.
*A01K 1/01* (2006.01)
*A01K 1/015* (2006.01)

(52) U.S. Cl.
CPC .................................. *A01K 1/0155* (2013.01)

(58) Field of Classification Search
CPC ... A01K 1/0155; A01K 1/0152; A01K 1/0154
USPC .................................. 119/171, 172
See application file for complete search history.

(56) References Cited

U.S. PATENT DOCUMENTS

| 4,258,660 A * | 3/1981 | Pris et al. ................ 119/171 |
| 4,727,824 A * | 3/1988 | Ducharme et al. ........... 119/171 |
| 5,085,175 A * | 2/1992 | Clements et al. ........... 119/171 |
| 5,347,950 A * | 9/1994 | Kasbo et al. ............... 119/171 |
| 2008/0110404 A1 | 5/2008 | Theis et al. |

FOREIGN PATENT DOCUMENTS

| WO | WO 9718702 | 6/1997 |
| WO | WO 2008116453 | 5/2009 |

\* cited by examiner

*Primary Examiner* — Yvonne Abbott-Lewis
(74) *Attorney, Agent, or Firm* — Cherskov Flaynik & Gurda, LLC

(57) ABSTRACT

The object of invention is an animal cage litter composition, especially suitable for cats, in the form of compacted and/or ground down sunflower hulls, in the amount from 1% to 100%, preferably 100%, with addition of the known binder, in the amount from 0% to 50%, and/or the known filler, in the amount from 0% to 80%, in the total mass of compacted sunflower hulls.

3 Claims, No Drawings

ANIMAL CAGE LITTER COMPOSITION, ESPECIALLY SUITABLE FOR CATS

CROSS REFERENCE TO RELATED APPLICATIONS

This application claims the benefit of Polish Utility Application No. P. 405245 filed on Sep. 5, 2013 presently pending, the contents of which are hereby incorporated by reference.

TECHNICAL FIELD

The present invention relates generally to an animal cage litter composition, especially suitable for cats. The product is made from pure plant fibers is 100% natural and biologically recyclable.

BACKGROUND

The object of invention is to provide an animal cage litter composition, especially suitable for cats, to be used as bedding for small household furry animals' cages and as litter-box filler.

Currently known litter composition types used for breeding of small domestic or household furry animals, especially cats, are in the form of bentonite pet litters, silicon pellets or wood and plant based sawdust or briquettes.

For example, there are litter compositions for small pets, especially cats, disclosed in the Pat. description no. PL-188343 that comprise from 90% to 99% (w/w) of clay material, as the basic component, and from 10% to 1% (w/w) of wood dust or shavings, as filling material. Kaolinite, illite, montmorillonite, beidellite or their mixtures are used as the clay material. The litter composition is in the form of pellets.

Similar types of bentonite-based litters containing sodium bentonite, carbonate, silica-carbonate and silica rocks, volcanogenic rocks and synthetic minerals from the group of cellular concretes and microporous concretes subject to grinding, drying and/or roasting, Collodion cotton made from bentonite or silts and clay are presented in other patents, e.g. Chinese patents no. CN-10274251, CN-202406737, U.S. Pat. No. 6,860,234, European patent no. EP-2213162, Polish patent application no. P.365889 and patent publication no. P.391115, where clumping material comprises 80-95% of organic material, 5-20% of gelling composition enriched with 0-1% of aromatic mixture. The gelling composition comprises mineral compounds and natural organic substances, while the gelling agent comprises bentonite and guar gum or xanthan gum or Arabic gum, in proportion by weight 1:1 or 3:2. Bentonite in the litter composition mass amounts to 20-70% of the gelling composition, preferably to 40-60%, and organic substances amount to 30-80% of the gelling composition, preferably to 40-60%. The bentonite material used is in a micronized form, preferably, of granulation below 6 μm. Very fine wood sawdust is used as natural organic material.

In the publication of the patent application no. P.307317, the pet litter composition comprises clay mineral amounting from 90% to 99% (w/w) and wood dust or sawdust, from 10% to 1% (w/w), preferably with addition of aromatic substances, and in the publication of the invention no. P.365889, the animal litter composition comprises a mixture of an absorbent material such as clay and silica gel.

Also disclosed in American patent description no. US-212118242 is the litter for cats in the form of pellets shifting into the form of gelling colloid with its main component being superabsorbent polymers (SAP) of super absorbing properties completed with a binding agent.

Litter compositions based on plant waste and biomass are another group of animal cage litter compositions, including litter-box compositions to cover cat fecal waste. For example, the publication of the patent no. P.308952 concerning loose bedding for small livestock and cats that comprises environmentally harmless and easily decaying organic substance in the form of leached, compressed and then dried sugar beet pomace discloses an example of such litter compositions. Such pomace is the by-product from processing sugar from sugar beet. Sugar beet pomace is subject to pelletization to improve its sorptive capacity.

Whereas the object of invention applied for patent under no. P.307152 is an ecological litter composition for domestically bred rodents that comprises fine ground peat of relative humidity from 85 to 12%, acidity pH 4.0 and decomposition value from 28% to 32%, or high-moor peat of above-mentioned properties with addition of charcoal and calamus.

The next examples of litter compositions for small domestic animals' cages and/or litter boxes based on environmentally friendly waste are disclosed in the following patents: US patent no. US-7089882, Chinese patent no. CN-102150627 and PCT no. WO-2008116453, where the basic plant component is corn and/or corn cobs with addition of cereal grains. Corn cobs, beside a filler, can also contain plant resin that acts as a binding agent.

Whereas the object of the German patent no. DE-19543311 is a litter composition for cats in the form of briquettes that comprises wood with addition of a filler that acts at the same time as urine thickener. The thickener is guar flour that forms gel after contact with animal urine, which facilitates binding wood briquettes.

In case of the PCT no. WO-2013004879, an ecological litter composition for animals has been obtained from forest biomass and sea algae.

DETAILED DESCRIPTION

The disadvantage of the litter compositions presented, especially from the bentonite litter group, is their uncomfortable utilization, since they cannot be composted and may not be disposed in a toilet as they can block it. Furthermore, the litter composition used and thrown into a rubbish bin exudes a nasty smell. The main litter composition component—bentonite is a material that poorly binds and hardly absorbs odors, and when carried by a cat outside the litter box onto the floor in contact with water it will form a cement like mass that sticks to tiles and is hard to remove, especially from grout. Such litter composition is heavy and not very efficient, since it does not absorb odors and is hard to clump, and must be removed from the litter box completely. Similarly, wood-based litter compositions with gelling fillers are not suitable for disposal into toilets and they need additional aromatic substances. Sawdust based litter compositions are carried out of the litter box on cat's paws and cause mess in the house.

The animal cage litter composition, especially suitable for cats, in the form of pellets, sawdust or briquettes based on environmentally friendly plant waste with addition of a plant-based binder and filler, namely wood resin and/or fine shavings, according to the invention, is in the form of compacted and/or ground down sunflower hulls, in the amount from 1% to 100%, preferably 100%, with addition of the known binder, in the amount from 0% to 50%, and/or the known filler, in the amount from 0% to 80%, in the total mass of compacted sunflower hulls.

The animal cage litter composition, especially suitable for cats, as a product made from pure plant fibers is 100% natural and biologically recyclable. This litter composition is very efficient and thus economical in use. It has excellent clumping properties forming hard clumps, therefore, it does not generate dust or stick to animal paws and is not carried around by a cat so the floor near the litter box is not messy. The clumps formed by fecal matter are separated from the remaining clean litter composition and can be easily scooped out from the litter box. The used litter part does not make it necessary to remove the whole litter content from the litter box. In addition the part clumped by the waste does not stick to the litter box or leave stains in the litter box, so there is no need to wash the litter box each time after disposing the litter composition used. It absorbs even exceptionally strong odors, especially ammonia in cat's urine. As a 100% environmentally friendly product, the litter composition can be composted and disposed easily in a toilet. The litter composition, according to the invention, comprising, as a whole, sunflower hulls is light and cheap to manufacture and utilize. The litter composition is a hypoallergenic and environmentally friendly product.

The animal cage litter composition, especially suitable for cats, according to the invention, in the examples of methods therefore comprises:

Example I

The animal cage litter composition, especially suitable for cats, comprises 100% sunflower hull mass compacted in the form of briquettes. The briquettes are in the form of pressed cylinders of different sizes, from 0.3 cm to 1.50 cm, with the same cylinder diameter of approximately 0.4 cm.

Example II

The animal cage litter composition, especially suitable for cats, comprises the mass consisted of sunflower hulls compacted in the form of briquettes in the amount of 90% (w/w), 9% of wood shavings and 1% of resin. The briquettes are in the form of pressed cylinders of different sizes, from 0.3 cm to 1.50 cm, with the same cylinder diameter of approximately 0.4 cm.

Example III

The animal cage litter composition, especially suitable for cats, comprises 100% pelletized sunflower hull mass.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting, but are instead exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the terms "comprising" and "wherein." Moreover, in the following claims, the terms "first," "second," and "third," are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

The embodiment of the invention in which an exclusive property or privilege is claimed is defined as follows:

1. A cat litter composition comprising:
   briquettes comprising pressed cylinders having lengths of 0.3 cm to 1.50 cm and diameter of 0.4 cm;
   wherein said briquettes comprise 100% sunflower hull mass; and
   wherein said sunflower hull mass is compacted to form said briquettes.

2. A cat litter composition comprising:
   briquettes comprising pellets;
   wherein said briquettes comprise 100% sunflower hull mass; and
   wherein said sunflower hull mass is pelletized to form said pellets.

3. A cat litter composition comprising:
   briquettes comprising pressed cylinders having lengths of 0.3 cm to 1.50 cm and diameter of 0.4 cm;
   wherein said briquettes comprise 90% sunflower hull mass;
   wherein said briquettes comprise 9% of wood shavings;
   wherein said briquettes comprise 1% of resin; and
   wherein said sunflower hull mass, wood shavings, and resin are compacted to form said briquettes.

* * * * *